No. 704,257. Patented July 8, 1902.
J. G. HODGSON & J. C. TALIAFERRO.
CAN SOLDERING MACHINE.
(Application filed Nov. 24, 1900.)
(No Model.) 4 Sheets—Sheet 1.
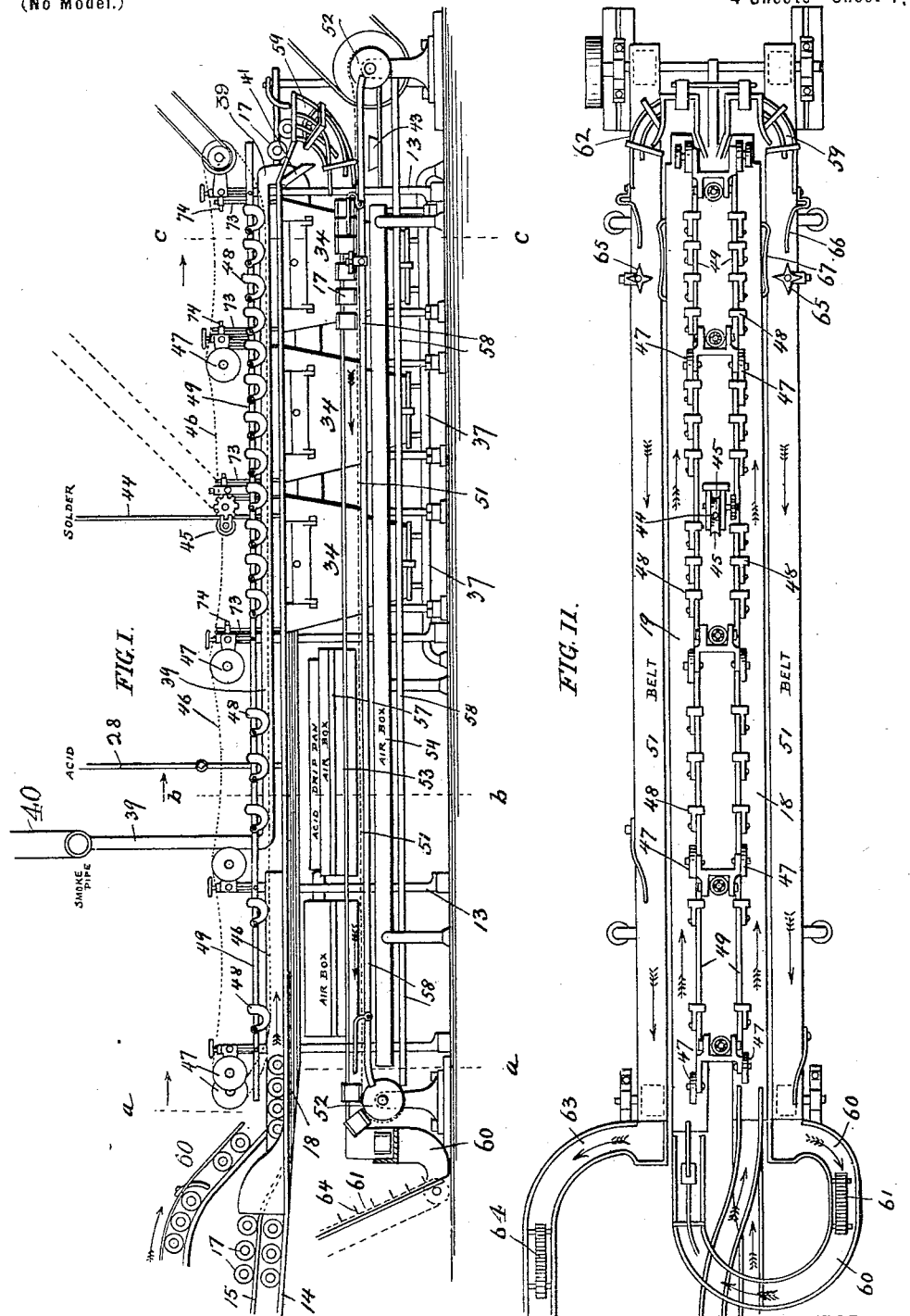
WITNESSES:
F. B. Townsend
H. W. V. Munday
INVENTORS,
John G. Hodgson & John C. Taliaferro
BY Munday Evarts Adcock
Their ATTORNEYS

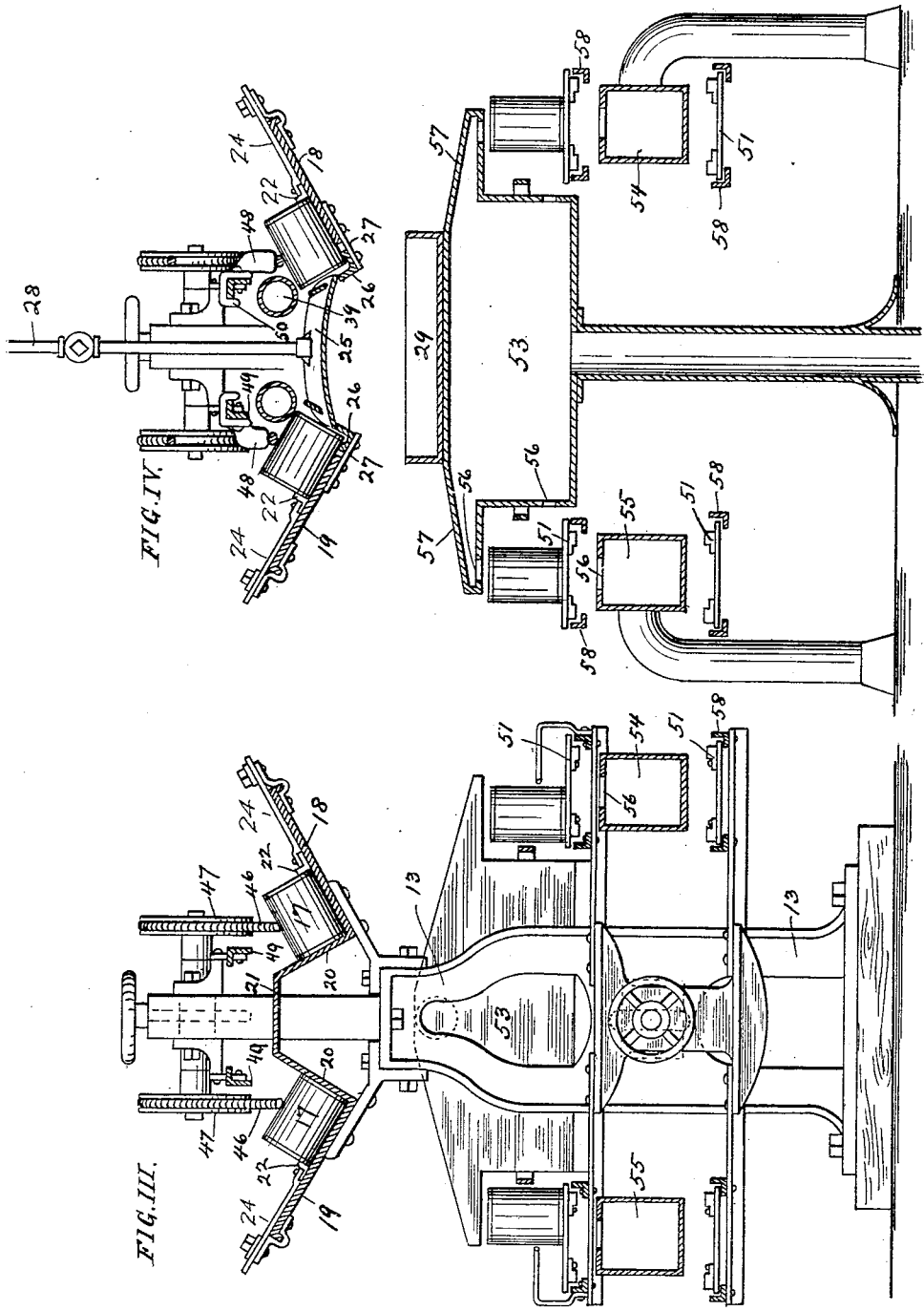

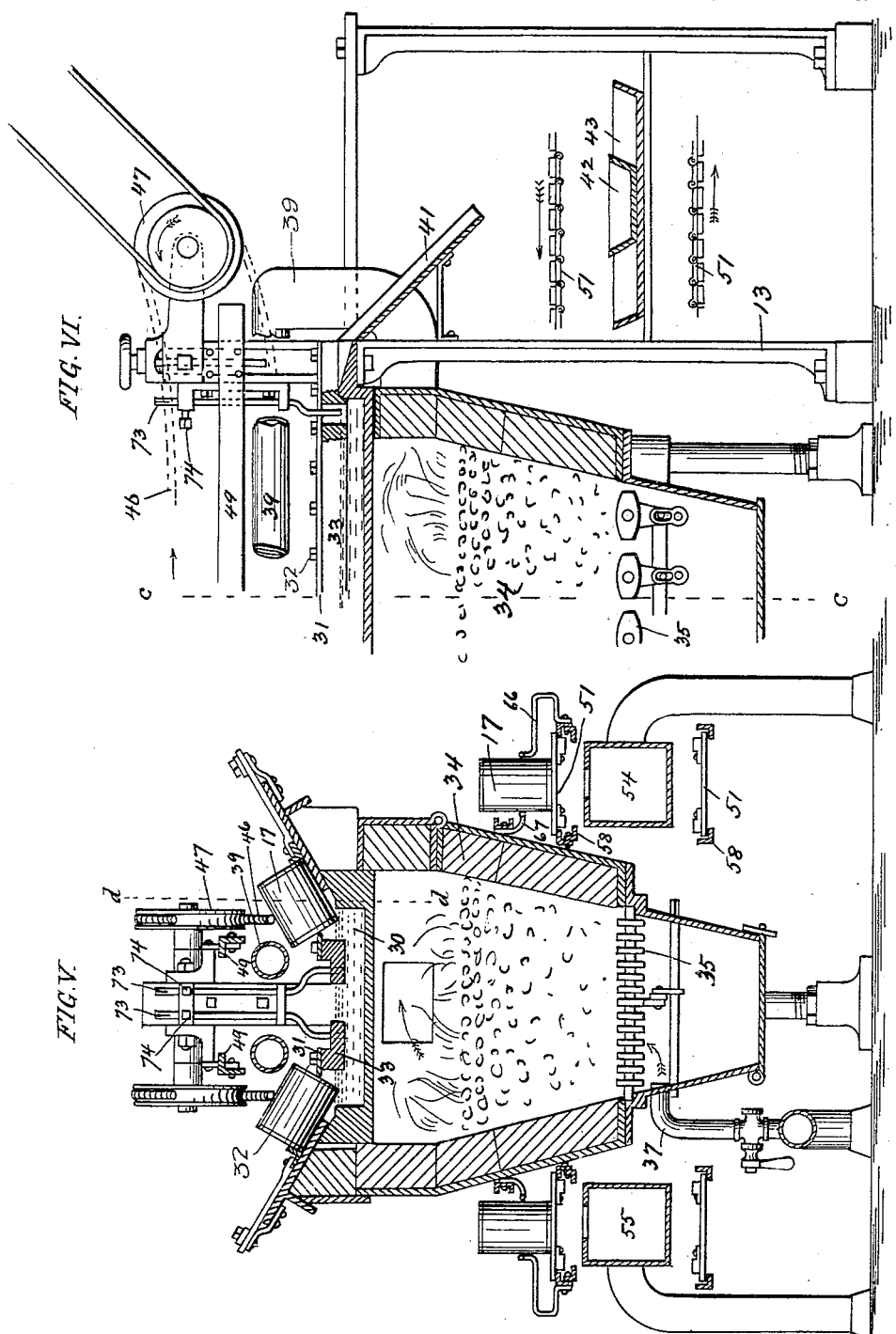

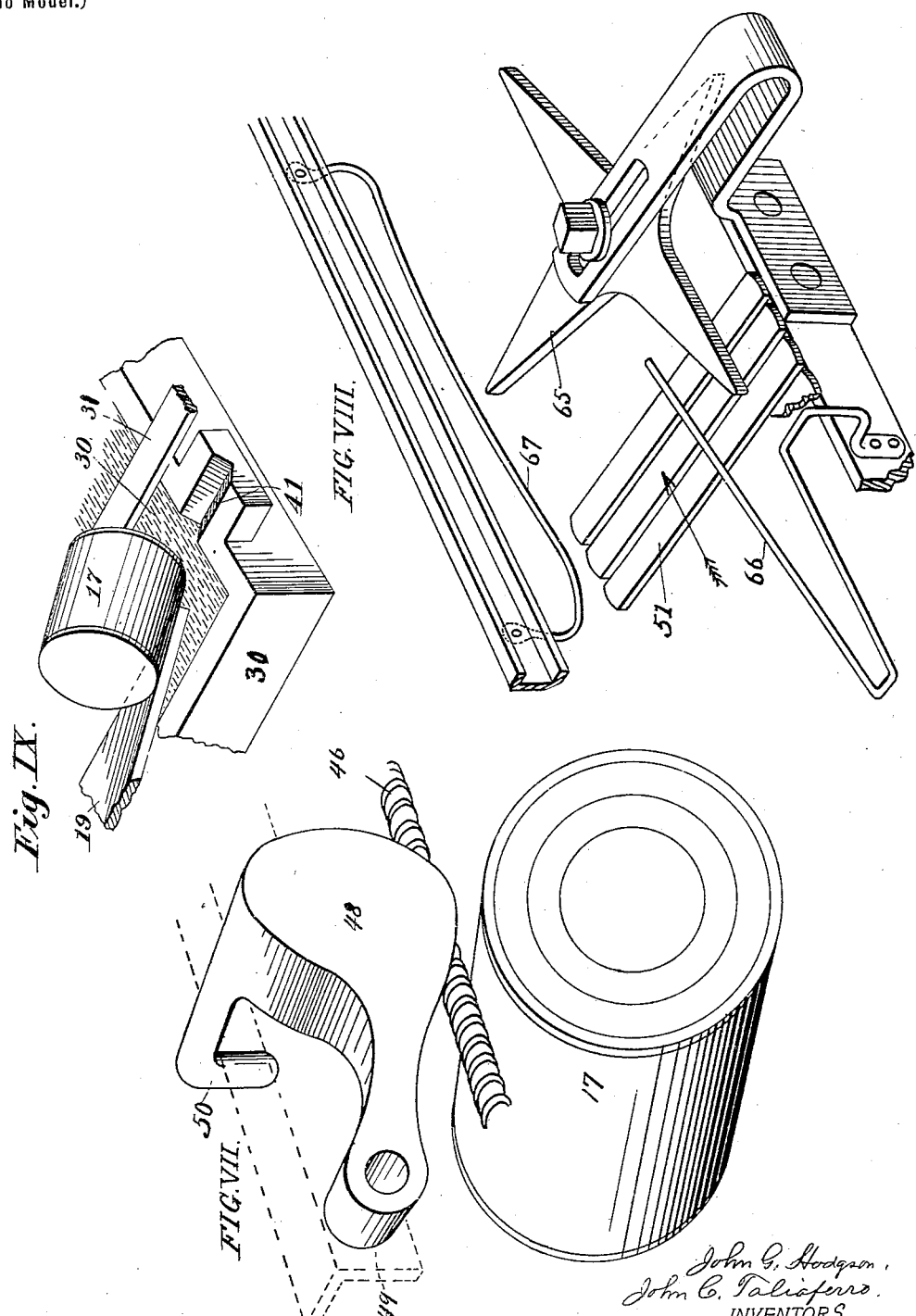

UNITED STATES PATENT OFFICE.

JOHN G. HODGSON, OF MAYWOOD, ILLINOIS, AND JOHN C. TALIAFERRO, OF BALTIMORE, MARYLAND, ASSIGNORS, BY MESNE ASSIGNMENTS, TO AMERICAN CAN COMPANY, OF JERSEY CITY, NEW JERSEY, A CORPORATION OF NEW JERSEY.

CAN-SOLDERING MACHINE.

SPECIFICATION forming part of Letters Patent No. 704,257, dated July 8, 1902.

Application filed November 24, 1900. Serial No. 37,599. (No model.)

*To all whom it may concern:*

Be it known that we, JOHN G. HODGSON, residing in Maywood, in the county of Cook and State of Illinois, and JOHN C. TALIAFERRO, residing in Baltimore, in the State of Maryland, citizens of the United States, have invented a new and useful Improvement in Can-Soldering Machines, of which the following is a specification.

This invention relates to machines or apparatus for soldering the end seams of sheet-metal cans. Its object is to provide an automatic machine of a simple, efficient, and durable construction by means of which the end seams of sheet-metal cans may be rapidly, economically, and perfectly soldered without requiring any hand labor or handling of the cans.

It consists in the novel construction of parts and devices and in the novel combinations of parts and devices herein shown and described, and specified in the claims, by which the above object or result is practically accomplished.

In the accompanying drawings, forming a part of this specification, Figure I is a side elevation of an automatic apparatus or machine embodying the invention. Fig. II is a plan view. Figs. III, IV, and V are cross-sections on lines *a a*, *b b*, and *c c* of Fig. I. Fig. VI is a detail vertical longitudinal section on line *d d* of Fig. V, and Figs. VII and VIII are detail perspective views of parts hereinafter described. Fig. IX is a detail perspective showing the solder-overflow of the solder bath or vessel in the path of the corners of the rolling cans.

In the drawings, 13 represents the frame of the machine; 14 15, chutes or runways down or along which the cans 17 to be soldered may automatically roll into the machine.

18 19 are transversely-inclined horizontally-extending plates along which the cans may be rolled in an inclined position and extending from one end of the machine to the other, one on one side of the machine and the other on the other, the cans rolling with one end downward along the plate 18 in soldering that end and with the other end downward along the other plate 19 when soldering the other end seam. For a portion of their length the inclined plates 18 19 are provided each with right-angle plates or flanges 20 20, which serve as guides for the lower ends of the can-bodies to rest against, as well as heating-plates for heating the end seams preparatory to the soldering operation, the plates or flanges being connected by a top 21, which is preferably integral with the plates 18 19 and their right-angle flanges 20 20. The inclined plates 18 19 are further provided with upper guide 22, secured thereto by clamps 24.

The portions of the inclined plates or guides 18 19 which extend over the flux or acid pan 25 are provided with small angular flux troughs or channels 26, secured thereto by connecting-straps 27, so that as the cans roll along their corners or end seams will come in contact with a shallow channel of acid or flux, and thus automatically flux the seam preparatory to its soldering. The bottom of the flux-pan is curved or inclined toward each of the flux-troughs 26, so that the flux which is continuously fed to the machine through the flux-feed pipe 28 will keep the shallow troughs 26 supplied therewith. The stream of acid or flux supplied to and flowing in the shallow troughs 26 overflows into the surplus-flux pan 29, located beneath the angle-troughs 26. The angle-troughs 26 also serve as a lower guide for the cans as they roll along.

30 is the solder bath or vessel over which the inclined can-body guide or track plates 18 19 extend. The lower guides 31 31 for the can-bodies, which extend over the solder bath or vessel 30, are adjustably secured by set-screws 32 to rails 33 33, which extend longitudinally across the solder vessel, so that the height of the can-bodies as they roll along the track can be accurately adjusted to the level of the surface of the molten solder in the solder-bath, which level is fixed and kept constant by means of a molten-solder overflow. The rails 33 33 are adjusted up and down and to and from each other as required by bent adjusting-rods 73, which are fixed in position by set-screws 74.

The molten-solder vessel or bath 30 extends over to and forms the top of a series of coal-burning furnaces 34, preferably three in number, each of which is furnished with a grate 35, a closed box beneath the grate, and an air feed or blast pipe 37. The exhaust flues or pipes 39 of the furnaces are turned back over the solder bath or vessel and extend horizontally above, along, and in close proximity to the path of the cans as they roll along the track over the aciding or fluxing troughs and the solder-bath, so that the waste heat of the furnaces may thus serve to heat the seams of the cans as they roll along preparatory to and during the soldering operation.

40 is the smoke-stack, in which the exhaust pipes or flues, one on each side of the machine, connect, the same being preferably located near the front end of the aciding or fluxing troughs.

The solder bath or vessel 30 is provided with a solder-overflow spout or channel 41 at the point where the cans roll out of the same and along which overflow spout or channel the corners of the cans roll, so that the rolling cans constantly moving along this overflow point or channel will themselves prevent the natural tendency of the molten solder to wall or pile up. By this simple expedient the height or level of the surface of the molten solder may be always maintained constant and at the exact point required to properly and perfectly solder the cans with certainty and reliability and with a minimum amount of solder and with a minimum extent of immersion or exposure of the seam or corner of the can in or to the solder. The surplus or overflowing solder is delivered from the overflow channel or spout into the pan or vessel 42 43. The solder is constantly fed into the solder bath or vessel, preferably in a continuous wire or rod form 44, by the solder-feed wheels or rollers 45, the feeding being done somewhat more rapidly than the solder is consumed or used in the soldering operation, so that the slight surplus of solder may pass out at the solder-overflow.

The cans are automatically rolled along the inclined can-body plates or tracks 18 19 by endless belts or chains 46 46, traveling on pulleys 47, said belt or chain being at intervals weighted by metal weights 48, resting thereon, and which are hinged at one end to longitudinal rails 49 of the frame. The weights increase the frictional grip of the chain or belt on the cans, and thus insure their continuous and proper rolling. Each of the pivoted weights 48 is provided with a bent guide-finger 50, overlapping the rail or bar 49 to hold it in position, while permitting its free end to move up and down. This construction permits the weights to be quickly removed or additional ones applied, as may be required.

51 51 are the can-cooling belts, traveling on horizontal pulleys 52, one on each side of the machine, for conveying the cans in an upright position, with the end thus soldered lowermost and resting flat on the cooling-belt, past along the air-blast or cooling boxes or trunks 53 54 55, from and by which cold air is projected upon the cans to cool the same through the openings 56. The upper central air-box 53 is provided with horizontal wings or extensions 57, projecting horizontally over the path of the cans, so as to direct the air therefrom downward against the cans. This central air-trunk also directs the air laterally outward against the cans. From the two lower air boxes or trunks 54 55 the air escapes upward against the cans. The air boxes or trunks are thus on three sides of the cans on the cooling-belt—that is to say, above, beneath, and at the inner side. The air is thus always projected not only against the outside of the can, but inside the same, thus cooling the same from the inside as well as from the outside. The blast of air may always enter the cans from either the air-box above or the air-box below the same, either through the open mouth of the can-body when only one head has been soldered thereon or else through the central stud-hole or filling-opening in the final head or top when both the can-heads have been soldered on the can-body. By this means the cans are quickly, adequately, and properly cooled while maintained in an upright position on the cooling-belt and before they are again turned into a horizontal position. This prevents all danger of defective seams from the solder running. Each of the cooling-belts 51 preferably consists of a series of metal slats connected to a pair of chains. The cooling-belts are guided or supported by guide-rails 58.

The cans after rolling along the inclined guide or track plate 18 pass down through a curved and twisted guideway 59, extending from the rear end of the track or plate 18 to the cooling-belt on that side of the machine and by which the cans are turned into an upright position and delivered onto the cooling-belt with the end just soldered downward. The cans after being conveyed in an upright position along the cooling-belt are turned from their upright position to a horizontal or rolling position as they pass over and around the cooling-belt pulley, and are thus delivered into a curved chute or runway 60, which delivers them to an endless belt or chain elevator 61, by which they are raised again above the level of the inclined plates or tracks 18 19. The cans then continue to roll along said curved chute or runway 60, which is of a loop form, so as to turn the cans end for end, and thus deliver them to the other can-body track-plate 19 with their recently-soldered ends uppermost and their still unsoldered ends downmost. The cans then in like manner are automatically rolled along the plate 19, thus soldering the other ends thereof. When the cans reach the end of the track or plate 19, they pass down through the other curved and twisted chute or passage-way 62 and are delivered onto the other cooling-belt, from which they are delivered to the discharge chute or runway 63, which is furnished with an endless belt or chain elevator 64.

In order to properly space the cans and prevent their crowding too close together, can-spacers 65, preferably consisting each of a star-wheel operating in conjunction with retarder-springs 66 67, are located in the path of the cans on the cooling-belts.

We claim—

1. In a can-end-soldering machine, the combination with a solder bath or vessel, of a fluxing device, a furnace for heating and keeping molten the solder, a pair of oppositely and transversely inclined can-body track-plates having upper and lower guides for the cans, can-carriers for rolling the cans along said plates, a pair of cooling-belts for conveying the cans in an upright position, a curved and twisted guideway for turning the cans into an upright position, and delivering them in such position to the cooling-belt, air trunks or boxes above, below and at the side of the cans as they are carried on the cooling-belts, an inclined loop-shaped track furnished with an elevator for conveying the cans from the first cooling-belt, turning them end for end and delivering them with their unsoldered ends downmost to the second can fluxing and soldering track or plate, and flues leading from the furnace horizontally over the solder-bath and fluxing device for heating the ends of the cans preparatory to soldering, said solder-bath having a solder-overflow passage or spout at a point where the cans roll out of the same, substantially as specified.

2. In a can-end-soldering machine, the combination with a solder bath or vessel, of means for automatically feeding solder thereto, and a track or guide extending over said solder vessel along which the cans may be rolled in an inclined position to present the end seam of the can to the molten solder, said solder bath or vessel having a solder overflow or channel in the path of the corners of the cans and along and through which the cans roll to prevent the solder from walling up, whereby the level or surface of the solder is maintained constant in respect to the guide or track for the cans, substantially as specified.

3. The combination with a solder-bath having a solder overflow or channel in the path of the corners or seams of the cans, and a track or guide for the cans to cause the corners or seams of the cans to pass through and along said solder overflow or channel to prevent the solder from walling up thereon, and means for automatically and continuously feeding the solder into said solder vessel, substantially as specified.

4. The combination with a solder-bath having a solder overflow or channel in the path of the corners or seams of the cans, and a track or guide for the cans to cause the corners or seams of the cans to pass through and along said solder overflow or channel to prevent the solder from walling up thereon, and solder-feed rollers for continuously feeding or delivering solder to said bath or vessel, substantially as specified.

5. In a soldering-machine, the combination with a can-cooling belt or conveyer, of air trunks or boxes furnished with openings for directing blasts of air against the top, bottom and sides of the cans as they are conveyed along the cooling-belt, substantially as specified.

6. In a can-soldering machine, the combination with a can-cooling belt or conveyer, of a can-spacer for automatically spacing the cans on the belt, substantially as specified.

7. In a can-soldering machine, the combination with a can-cooling belt or conveyer, of a can-spacer for automatically spacing the cans on the belt, and retractor-springs, substantially as specified.

8. In a can-soldering machine, the combination with a cooling-belt, of a star-wheel-shaped can-spacer 65 and retarder-springs 66 and 67, substantially as specified.

9. In a can-end-soldering machine, the combination with a solder bath or vessel, of a fluxing device, a furnace for heating and keeping molten the solder, a pair of oppositely and transversely inclined can-body track-plates having upper and lower guides for the cans, can-carriers for rolling the cans along said plates, a pair of cooling-belts for conveying the cans in an upright position, a curved and twisted guideway for turning into an upright position and delivering them in such position to the cooling-belt, air trunks or boxes above, below and at the side of the cans as they are carried on the cooling-belts, an inclined loop-shaped track furnished with an elevator for conveying the cans from the first cooling-belt, turning them end for end and delivering them with their unsoldered ends downmost to the second can fluxing and soldering track or plate, substantially as specified.

10. In a can-end-soldering machine, the combination with a solder bath or vessel, a pair of oppositely and transversely inclined can-body track-plates having upper and lower guides for the cans, can-carriers for rolling the cans along said plates, a pair of cooling-belts, and an inclined loop-shaped track furnished with an elevator for conveying the cans from the first cooling-belt turning them end for end and delivering them with their unsoldered ends downmost to the second inclined track-plate, substantially as specified.

11. In a can-end-soldering machine, the combination with a solder bath or vessel, of an inclined track-plate along which the cans roll, a can-carrier for rolling the cans along said plate, rail 49 and pivoted weights 48 furnished with guide-fingers 50 overhanging said rail 49, substantially as specified.

12. The combination with a can-rolling chain 46, of a rail 49, metal weights 48 pivoted to said rail 49 and provided with guide-fingers 50, substantially as specified.

13. In a can-soldering machine, the combination with the flux or acid pan 25, of an inclined plate or guide 18 along which the cans are rolled, provided with small angular flux troughs or channels 26 at each side of and below the flux-pan 25, so that as the cans roll along said track-plate their end seams will come in contact with a shallow channel of acid or flux flowing in said trough, substantially as specified.

14. In a can-soldering machine, the combination with the flux or acid pan 25, of an inclined plate or guide 18 along which the cans are rolled, provided with small angular flux troughs or channels 26, at each side of and below the flux-pan 25 so that as the cans roll along said track-plate their end seams will come in contact with a shallow channel of acid or flux flowing in said trough, and a surplus-flux pan 29 beneath the angle-trough 26, substantially as specified.

15. In a can-end-soldering machine the combination with a plurality of coal-burning furnaces, each having an open top, a grate, a fire-box above the grate, and a box beneath the grate, of a single molten-solder vessel, extending over all of the furnaces and resting on and closing the tops thereof, tracks, or guides, extending to, from and over the solder-bath, and along which the cans may be rolled, and means for rolling the cans along said track, substantially as specified.

16. In a can-end-soldering machine the combination with a plurality of coal-burning furnaces arranged in line with each other and having each an open top, a grate, a fire-box above the grate and a closed box beneath the grate, and provided each with an air feed or blast pipe entering said closed box, of a single molten-solder vessel extending over all of the furnaces and resting on and closing the tops thereof, said solder vessel being directly above the plurality of grates and receiving the radiant heat of the furnace fire-boxes of which it forms the top, tracks or guides extending to, from and over the solder-bath along which the cans may be rolled, and a means for rolling the cans along said track substantially as specified.

Dated October 16, 1900.

JOHN G. HODGSON.
JOHN C. TALIAFERRO.

Witnesses:
H. M. MUNDAY,
EDMUND ADCOCK.